US010511772B2

United States Patent
Brunner et al.

(10) Patent No.: US 10,511,772 B2
(45) Date of Patent: Dec. 17, 2019

(54) IMAGE CAPTURING DEVICE HAVING CONTINUOUS IMAGE CAPTURE

(71) Applicant: Apple Inc., Cupertino, CA (US)

(72) Inventors: Ralph Brunner, Cupertino, CA (US); Nikhil Bhogal, San Francisco, CA (US); James David Batson, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/054,740

(22) Filed: Aug. 3, 2018

(65) Prior Publication Data
US 2019/0037140 A1   Jan. 31, 2019

Related U.S. Application Data

(60) Continuation of application No. 15/357,406, filed on Nov. 21, 2016, now Pat. No. 10,063,778, which is a
(Continued)

(51) Int. Cl.
*H04N 5/265* (2006.01)
*H04N 5/232* (2006.01)
(Continued)

(52) U.S. Cl.
CPC ....... *H04N 5/23254* (2013.01); *H04N 1/2137* (2013.01); *H04N 5/144* (2013.01);
(Continued)

(58) Field of Classification Search
CPC ............ H04N 5/23222; H04N 19/172; H04N 5/23245; H04N 5/23267; H04N 5/2353;
(Continued)

(56) References Cited

U.S. PATENT DOCUMENTS

| 4,647,975 A | 3/1987 | Alston et al. |
| 5,043,816 A | 8/1991 | Nakano et al. |

(Continued)

FOREIGN PATENT DOCUMENTS

| JP | 2006-140892 | 6/2006 |
| WO | WO-02/093272 | 11/2002 |

OTHER PUBLICATIONS

"COOLPIX S230, Smart picture-taking at your fingertips," Nikon, Imaging Products, COOLPIX S230, 2009 Release, Apr. 16, 2009, http://imaging.nikon.com/products/imaging/lineup/digitalcamera/coolpix/s320/index.htm, 3 pages.
(Continued)

*Primary Examiner* — Hung H Lam
(74) *Attorney, Agent, or Firm* — Womble Bond Dickinson (US) LLP

(57) ABSTRACT

Methods, devices, and systems for continuous image capturing are described herein. In one embodiment, a method includes continuously capturing a sequence of images with an image capturing device. The method may further include storing a predetermined number of the sequence of images in a buffer. The method may further include receiving a user request to capture an image. In response to the user request, the method may further include automatically selecting one of the buffered images based on an exposure time of one of the buffered images. The sequence of images is captured prior to or concurrently with receiving the user request.

24 Claims, 7 Drawing Sheets

Related U.S. Application Data division of application No. 14/322,215, filed on Jul. 2, 2014, now Pat. No. 9,525,797, which is a continuation of application No. 13/648,834, filed on Oct. 10, 2012, now Pat. No. 8,803,981, which is a division of application No. 12/479,756, filed on Jun. 5, 2009, now Pat. No. 8,289,400.

(51) Int. Cl.
| | | |
|---|---|---|
| *H04N 5/14* | (2006.01) | |
| *H04N 5/781* | (2006.01) | |
| *H04N 1/21* | (2006.01) | |
| *H04M 1/725* | (2006.01) | |
| *H04N 5/235* | (2006.01) | |
| *H04N 7/18* | (2006.01) | |

(52) U.S. Cl.
CPC ......... *H04N 5/232* (2013.01); *H04N 5/23216* (2013.01); *H04N 5/23267* (2013.01); *H04N 5/23293* (2013.01); *H04N 5/265* (2013.01); *H04N 5/781* (2013.01); *H04M 1/72544* (2013.01); *H04N 5/2354* (2013.01); *H04N 7/181* (2013.01)

(58) Field of Classification Search
CPC ............... H04N 9/735; H04N 5/23212; H04N 5/23229; H04N 5/247; H04N 19/164; H04N 5/23216; H04N 5/23296; H04N 5/23254; H04N 9/045
See application file for complete search history.

(56) References Cited

U.S. PATENT DOCUMENTS

| | | | |
|---|---|---|---|
| 5,471,405 A | 11/1995 | Marsh | |
| 5,612,786 A | 3/1997 | Huber et al. | |
| 6,013,007 A | 1/2000 | Root | |
| 6,032,108 A | 2/2000 | Seiple | |
| 6,135,951 A | 10/2000 | Richardson et al. | |
| 6,357,147 B1 | 3/2002 | Darley et al. | |
| 6,373,481 B1 | 4/2002 | Tan et al. | |
| 6,463,385 B1 | 10/2002 | Fry | |
| 6,539,336 B1 | 3/2003 | Vock et al. | |
| 6,560,903 B1 | 5/2003 | Darley | |
| 6,582,342 B2 | 6/2003 | Kaufman | |
| 6,619,835 B2 | 9/2003 | Kita | |
| 6,693,672 B1 | 2/2004 | Oliver | |
| 6,716,139 B1 | 4/2004 | Hosseinzadeh-Dolkhani et al. | |
| 6,790,178 B1 | 9/2004 | Mault et al. | |
| 6,793,607 B2 | 9/2004 | Neil | |
| 6,898,550 B1 | 5/2005 | Blackadar et al. | |
| 7,030,735 B2 | 4/2006 | Chen | |
| 7,062,225 B2 | 6/2006 | White | |
| 7,133,069 B2 | 11/2006 | Wallach et al. | |
| 7,171,331 B2 | 1/2007 | Vock et al. | |
| 7,174,227 B2 | 2/2007 | Kobayashi et al. | |
| 7,200,517 B2 | 4/2007 | Darley et al. | |
| 7,251,454 B2 | 7/2007 | White | |
| 7,278,966 B2 | 10/2007 | Hjelt et al. | |
| 7,292,867 B2 | 11/2007 | Werner et al. | |
| 7,454,002 B1 | 11/2008 | Gardner et al. | |
| 7,508,438 B2 | 3/2009 | Okamoto et al. | |
| 7,519,327 B2 | 4/2009 | White | |
| 7,596,249 B2 | 9/2009 | Bacus et al. | |
| 7,618,345 B2 | 11/2009 | Corbalis et al. | |
| 7,656,451 B2 | 2/2010 | Yanagi ..................... 348/333.11 | |
| 7,670,263 B2 | 3/2010 | Ellis et al. | |
| 7,856,176 B2 | 12/2010 | Yoon et al. | |
| 7,948,526 B2* | 5/2011 | Onoda ................. H04N 1/2145 | |
| | | | 348/222.1 |
| 8,797,403 B2* | 8/2014 | Suzuki ............. G08B 13/19671 | |
| | | | 348/143 |
| 9,179,060 B2* | 11/2015 | Safaee-Rad .......... H04N 5/2253 | |
| 2002/0077784 A1 | 6/2002 | Vock et al. | |
| 2003/0020958 A1 | 1/2003 | Bean ..................... H04N 5/254 |
| | | | 358/302 |
| 2003/0052989 A1 | 3/2003 | Bean ..................... H04N 5/238 |
| | | | 348/362 |
| 2003/0097878 A1 | 5/2003 | Farringdon et al. | |
| 2003/0170552 A1 | 9/2003 | Miyashita | |
| 2003/0174228 A1 | 9/2003 | Brake et al. | |
| 2003/0184667 A1 | 10/2003 | Aoyama | |
| 2003/0189647 A1 | 10/2003 | Kang ....................... 348/207.99 |
| 2004/0169767 A1 | 9/2004 | Norita et al. ................. 348/350 |
| 2004/0233317 A1 | 11/2004 | Matsushita | |
| 2005/0172311 A1 | 8/2005 | Hjelt et al. | |
| 2005/0259888 A1 | 11/2005 | Ozluturk | |
| 2005/0264678 A1 | 12/2005 | Butterworth | |
| 2005/0280733 A1 | 12/2005 | Imaizumi | |
| 2006/0082672 A1 | 4/2006 | Peleg ................. H04N 5/23293 |
| | | | 348/333.01 |
| 2006/0098106 A1 | 5/2006 | Tanaka | |
| 2006/0098186 A1 | 5/2006 | Yumiki ....................... 356/3.07 |
| 2006/0132623 A1 | 6/2006 | Nozaki et al. ........... 348/231.99 |
| 2007/0009244 A1 | 1/2007 | Takahashi | |
| 2007/0040805 A1 | 2/2007 | Mellot | |
| 2007/0147814 A1 | 6/2007 | Nomura et al. | |
| 2007/0195385 A1 | 8/2007 | Matsuzaka | |
| 2007/0203394 A1* | 8/2007 | Wiklof ............... A61B 1/00188 |
| | | | 600/109 |
| 2007/0216796 A1 | 9/2007 | Lenel et al. | |
| 2007/0253732 A1 | 11/2007 | Usui | |
| 2007/0269196 A1 | 11/2007 | Misawa | |
| 2008/0187181 A1 | 8/2008 | Meadow | |
| 2008/0198243 A1* | 8/2008 | Kijima ................. H04N 1/2112 |
| | | | 348/231.99 |
| 2008/0259170 A1 | 10/2008 | Hatanaka | |
| 2008/0259176 A1 | 10/2008 | Tamaru | |
| 2008/0266406 A1 | 10/2008 | McLeod et al. | |
| 2008/0304816 A1 | 12/2008 | Ebato | |
| 2008/0316332 A1 | 12/2008 | Knutson-Ek | |
| 2009/0010507 A1 | 1/2009 | Geng ..................... G06T 7/0075 |
| | | | 382/128 |
| 2009/0073286 A1 | 3/2009 | Sugino et al. | |
| 2009/0091633 A1 | 4/2009 | Tamaru | |
| 2009/0102946 A1 | 4/2009 | Tischer .................. H04N 5/235 |
| | | | 348/231.99 |
| 2009/0128642 A1 | 5/2009 | Koh et al. | |
| 2009/0135264 A1 | 5/2009 | John | |
| 2009/0160959 A1 | 6/2009 | Wantanabe et al. | |
| 2009/0290028 A1 | 11/2009 | Yamasaki .......... H04N 6/23212 |
| | | | 348/208.1 |
| 2010/0079621 A1 | 4/2010 | Jang | |
| 2010/0265357 A1 | 10/2010 | Liu et al. | |
| 2010/0289925 A1 | 11/2010 | Koshikawa .......... H04N 9/8205 |
| | | | 648/239 |
| 2010/0309334 A1 | 12/2010 | James et al. | |
| 2010/0309335 A1 | 12/2010 | Brunner et al. | |
| 2011/0001843 A1 | 1/2011 | Koishi ................. H04N 1/6086 |
| | | | 348/223.1 |
| 2011/0022982 A1 | 1/2011 | Takaoka .............. G06F 3/04817 |
| | | | 715/810 |
| 2011/0141307 A1 | 6/2011 | Seto ......................... H04N 5/232 |
| | | | 348/222.1 |
| 2011/0181742 A1 | 7/2011 | Nozaki et al. | |
| 2011/0205376 A1 | 8/2011 | Wulff ....................... G01P 1/127 |
| | | | 348/208.2 |
| 2014/0354850 A1* | 12/2014 | Kosaka ................. G06F 3/0488 |
| | | | 348/231.5 |

OTHER PUBLICATIONS

"Nikon Best Shot Selector™", *Best Shot Selector*, Apr. 16, 2009, http://digitalimaging.patyuen.com/shootout/cp5kyg2/bss.htm, 1 page.
"Nikon D5000, Innovative Vari-angle monitor, outstanding image quality and digital SLR movie function," *Nikon, Imaging Products, Nikon D5000*, Apr. 16, 2009, http://imaging.nikon.com/products/imaging/lineup/digitalcamera/slr/d5000/index.htm, 2 pages.
fixya.com, "Online User Manual and Guide for Casio Exilim EX-Z750 Digital Camera," K842PCM1DMX, http://www.fixya.

(56) References Cited

OTHER PUBLICATIONS com/support/p293749-casio_exilim_ex_z750_digital_camera/manual-806/page-103#, Apr. 16, 2009, p. 103.

* cited by examiner

IMAGE CAPTURING DEVICE HAVING CONTINUOUS IMAGE CAPTURE

CROSS-REFERENCED APPLICATION

This application is a continuation of co-pending U.S. application Ser. No. 15/357,406 filed Nov. 21, 2016, now issued as U.S. Pat. No. 10,063,778, which is a divisional of U.S. application Ser. No. 14/322,215 filed on Jul. 2, 2014, now issued as U.S. Pat. No. 9,525,797, which is a continuation of U.S. application Ser. No. 13/648,834, filed on Oct. 10, 2012, now issued as U.S. Pat. No. 8,803,981, which is a divisional of application Ser. No. 12/479,756, filed on Jun. 5, 2009, now issued as U.S. Pat. No. 8,289,400, which is related to the following commonly-owned, concurrently-filed application: application publication no. US2010/0309334, filed Jun. 5, 2009, entitled "Camera Image Selection Based on Detected Device Movement" and is incorporated by reference in entirety herein.

TECHNOLOGY FIELD

At least some embodiments of the present invention relate to image capturing devices having continuous image capture.

BACKGROUND

Image capturing devices include cameras, portable handheld electronic devices, and electronic devices. These image capturing devices typically use a preview resolution for capturing a preview image of a scene. Subsequently, a user provides an input to take a photograph. The device switches from preview resolution to full resolution prior to capturing an image. Switching from preview to full resolution causes a time lag, which may lead to user frustration. Also, camera shake during the time when a user presses a button or touches a touchscreen can degrade image quality.

SUMMARY

Methods, devices, and systems for continuous image capturing are described herein. In one embodiment, a method can include continuously capturing images with an image capturing device. The method can include storing a predetermined number of the sequence of images in a buffer. The device can receive a user request to capture an image. The method can automatically select one of the buffered images based on one or more parameters. For example, the selection may be based on an exposure time of one of the buffered images and optionally an image quality parameter (e.g., image contrast). Alternatively, the selection may be based only on the image quality parameter. The sequence of images can be captured just prior to or concurrently with receiving the user request. The method can include automatically displaying the selected image on the display of the image capturing device. These operations can be initiated after the device enters an image capturing mode or other mode. For example, the device may have many functions and capabilities (e.g., the device may be a smart phone or personal digital assistant (PDA) which can send and receive emails, allow surfing of the internet, create documents, and also act as a camera), and a user can place the device into camera mode in order to cause it to begin these continuous operations. In an embodiment, the device is not continuously performing these operations when it is not in camera mode.

In an embodiment, the continuously captured images can be captured in full resolution. The sequence of images can be advantageously captured just prior to the device receiving the user request for the photograph to avoid camera shake associated with the user request (e.g., pressing a shutter button, touching a touchscreen). One of the sequence of images can be automatically selected and displayed in full resolution in response to receiving the user request.

The present invention can include systems and devices that perform these methods, including data processing systems which perform these methods, and machine readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Methods, devices, and systems for continuous image capturing are described herein. In one embodiment, a method includes continuously capturing, after entry into an image capturing mode, a sequence of images with an image capturing device. The method stores a predetermined number of the sequence of images in a buffer. The device receives a user request to capture an image. The method automatically selects one of the buffered images based on one or more parameters. For example, the selection may be based on an exposure time and optionally an image quality parameter (e.g., image contrast). The sequence of images are captured just prior to or concurrently with receiving the user request. The method automatically displays the selected image in full resolution on the display of the image capturing device.

Advantageously, an image captured prior to a user requesting the capture of an image has an image quality that is not degraded by camera shake associated with the user request.

Figure 1:
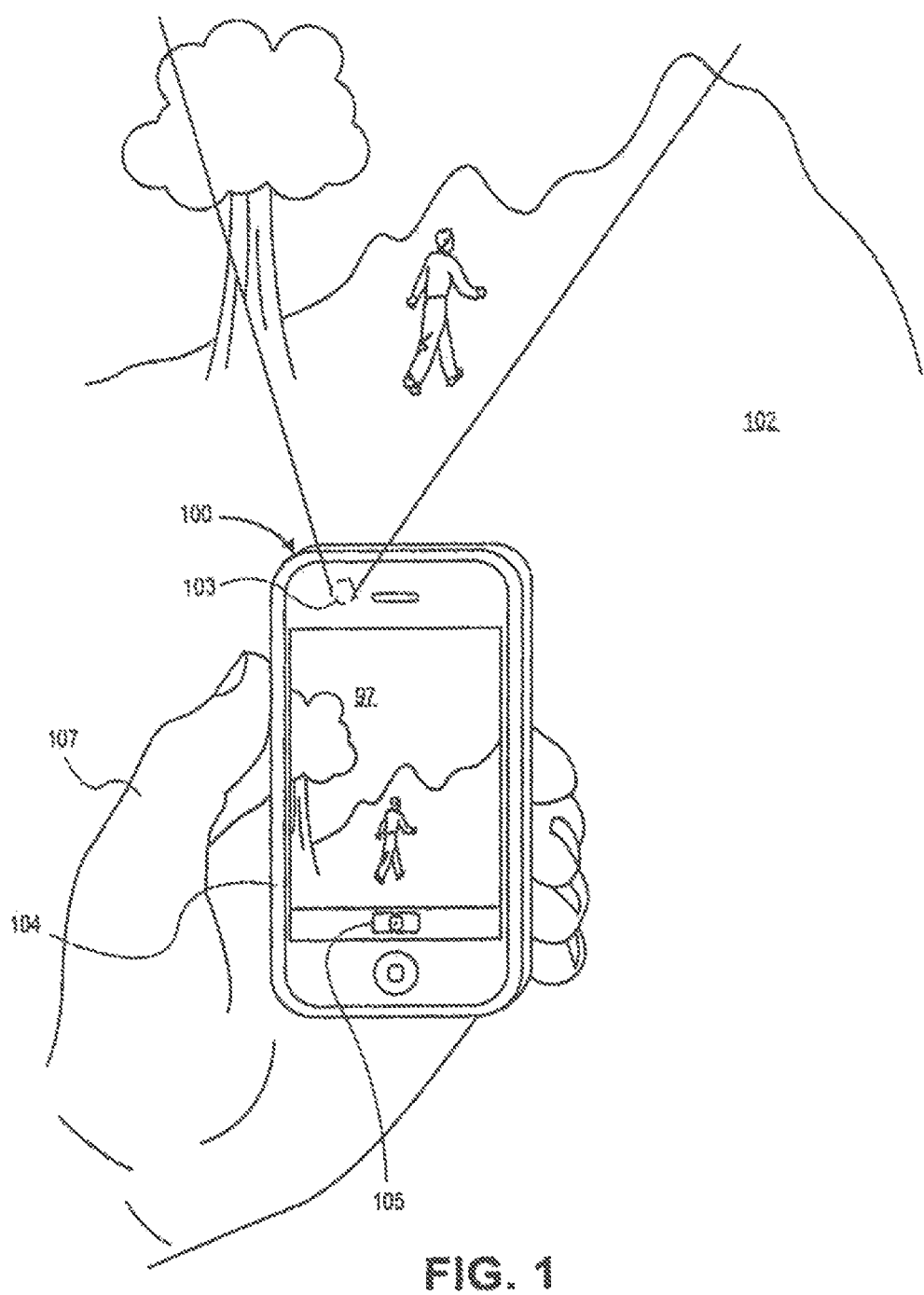
FIG. 1 shows a portable handheld device having a built-in digital camera and a touch sensitive screen in accordance with one embodiment of the present invention.

FIG. 1 shows a portable image capturing device 100 having a built-in digital camera in accordance with one embodiment. In this example, the portable device 100 is shown while it is held in the user's hand 107. The device 100 may be an IPHONE device by Apple Inc., of Cupertino, Calif. Alternatively, it could be any other electronic device that has a built-in digital camera. The built-in digital camera includes a lens 103 located in this example on the back face of the device 100. The lens may be a fixed optical lens system or it may have focus and optical zoom capability. Although not depicted in FIG. 1, inside the device 100 are an electronic image sensor and associated hardware circuitry and running software that can capture a digital image of a scene 102 that is before the lens 103.

The digital camera functionality of the device 100 optionally includes an electronic or digital viewfinder for an image capturing mode. In FIG. 1, the scene 102 is displayed on the screen. Upon initiation of the image capture mode, images 97 are continuously captured and displayed on the screen.

The viewfinder displays live, captured video (e.g., series of images) or images in full resolution of the scene 102 that is before the camera, on a portion of the touch sensitive screen 104 as shown. In this case, the digital camera also includes a soft or virtual shutter button whose icon 105 is displayed by the screen 104, directly below the viewfinder image area. As an alternative or in addition, a physical shutter or non-virtual button may be implemented in the device 100. The device 100 includes all of the needed circuitry and/or software for implementing the digital camera functions of the electronic viewfinder, shutter release, continuous image capturing, storing of a predetermined number of the sequence of images, and automatic selection of an image based on one or more parameters (e.g., exposure, image quality parameter) as described below.

Figure 2:
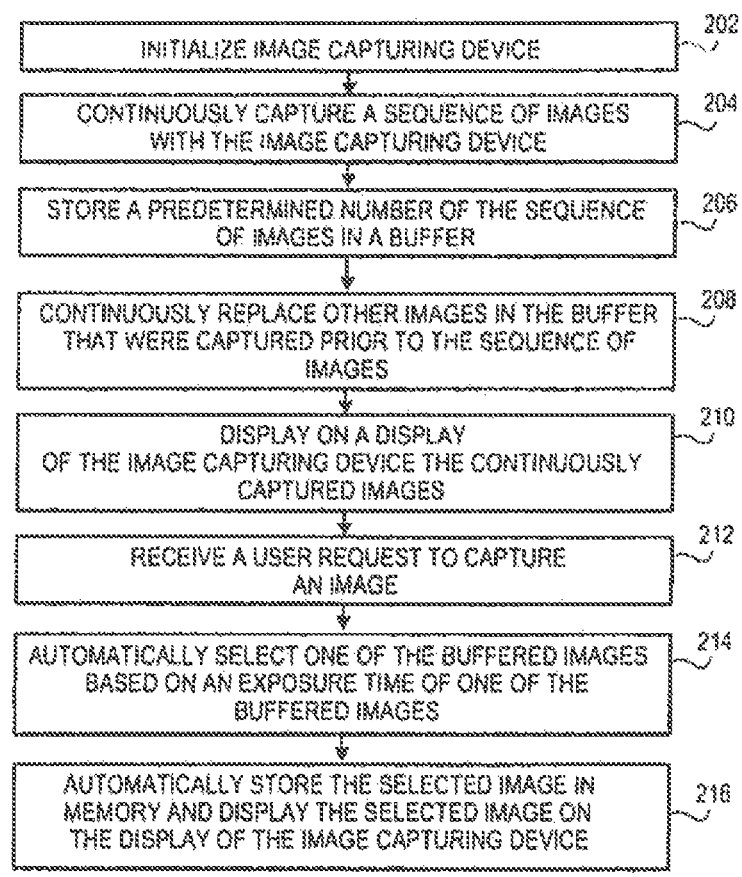
FIG. 2 illustrates a flow diagram of a continuous image capture mode for an image capturing device in accordance with embodiments of the present invention.

FIG. 2 illustrates a flow diagram of a continuous image capture mode for an image capturing device in accordance with embodiments of the present invention. The image capturing device is initialized at block 202. Initialization includes powering the image capturing device and selecting an image capture mode. In one embodiment, processing logic executes the operations of the image capture mode. The processing logic may include hardware (circuitry, dedicated logic, etc.), software (such as is run on a general purpose computer system or a dedicated machine or a device), or a combination of both. The processing logic can continuously capture images with the image capturing device at block 204. The processing logic can store a predetermined number (e.g., 2, 3, 4, 5) of the sequence of images in a buffer at block 206. In an embodiment, a new image is captured and stored in the buffer at a certain rate (e.g., $\frac{1}{15}$ of a second). The processing logic can continuously purge or replace other images in the buffer that were previously captured prior to the sequence of images at block 208.

Figure 4:
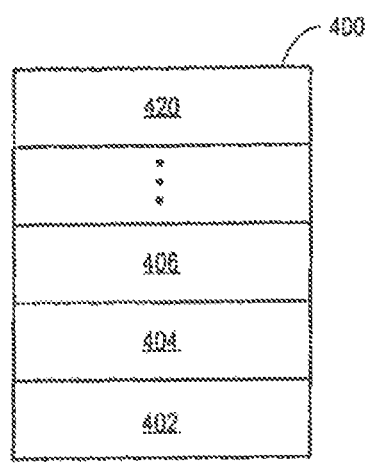
FIG. 4 illustrates an exemplary buffer for storing a predetermined number of the sequence of images in accordance with one embodiment of the present invention.

FIG. 4 illustrates an exemplary buffer for storing a predetermined number of the sequence of images in accordance with one embodiment of the present invention. The buffer 400 includes available memory spaces 402-420 for the storing the captured images. A predetermined number (e.g., 3) of the sequence of images are stored in the buffer 400. These images are captured just prior to receiving the user request to take a photograph. Memory resources can be conserved in that only the sequence of images are stored with previously captured images being purged.

Returning to FIG. 2, the processing logic can display on a display of the image capturing device the continuously captured images at block 210. In an embodiment, the continuously captured images are displayed prior to receiving a user request to capture an image at block 212. The processing logic can automatically select one of the sequence of images based on an exposure time and optionally an image quality parameter (e.g., image contrast) at block 214. Alternatively, the selection can be based only on the image quality parameter. More details regarding the automatic selection of an image will be described below in conjunction with the description of FIG. 3.

In one embodiment, the sequence of images includes only images captured just prior to receiving the user request. In one embodiment, the sequence of images does not include images captured after receiving the user request. In an alternative embodiment, the sequence of images may include images captured before receiving the user request and at approximately the time of receiving the user request. In another alternative embodiment, the sequence of images may include images captured before, during, and/or after receiving the user request.

In one embodiment, the sequence of images is captured just prior to receiving the user request. The processing logic can automatically store the selected image in memory and display the selected image on the display of the image capturing device at block 216. The memory may be used to store photos or video in the form of a user-initiated photo or video library.

In an embodiment, the continuously captured images and the selected image are captured and displayed in full resolution. A user can quickly capture an image with minimal time lag between sending a request to take a photograph and the capture of the image. The sequence of images are advantageously captured just prior to the processing logic receiving the user request for the photograph to avoid camera shake associated with the user request (e.g., pressing a shutter button, touching a touchscreen).

Figure 3:
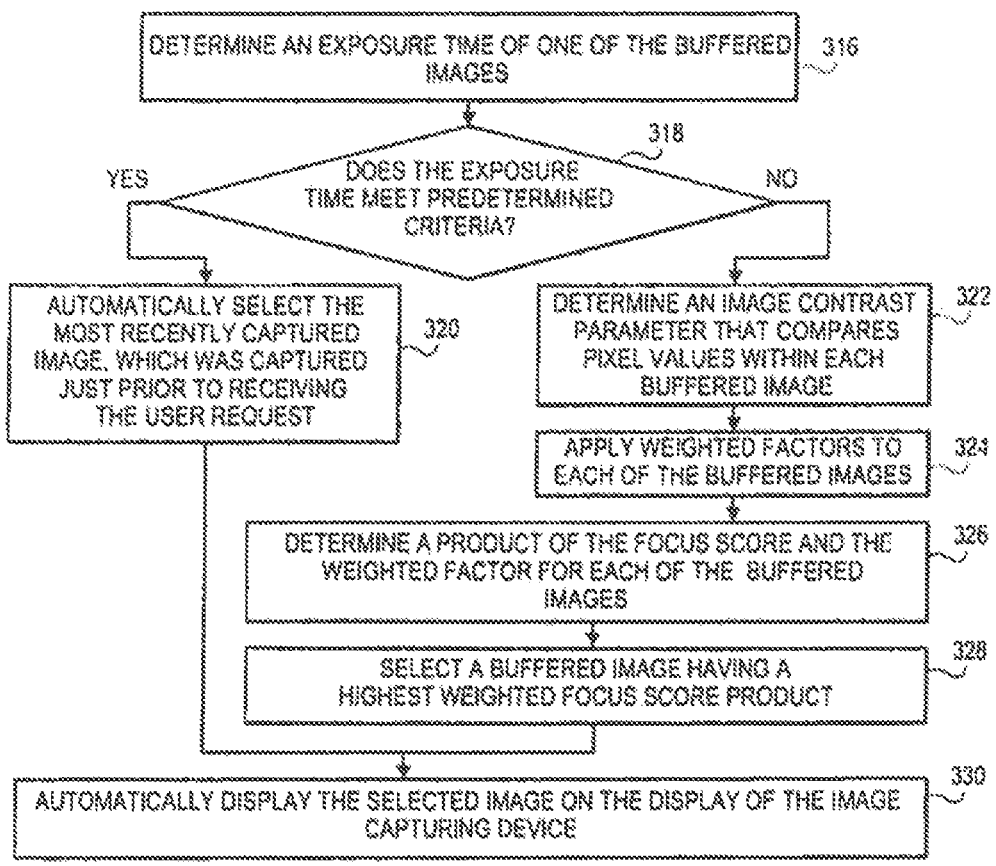
FIG. 3 illustrates a detailed flow diagram of a continuous image capture mode for an image capturing device in accordance with embodiments of the present invention.

FIG. 3 illustrates a detailed flow diagram of an automatic selection of one of the sequence of images in image capture mode for an image capturing device in accordance with embodiments of the present invention. In some embodiments, automatically selecting one of the sequence of images includes determining an exposure time for one of the buffered images (e.g., most recently captured image) at block 316. The processing logic can determine whether the exposure time meets predetermined criteria that is based on a predetermined threshold exposure time (e.g., $\frac{1}{100}$ of a second) at block 318. For example, the processing logic can determine whether the exposure time is less than, approximately equal to, or greater than the predetermined threshold exposure time. In an embodiment, the processing logic determines whether the exposure time meets predetermined criteria (e.g., is exposure time less than the predetermined threshold exposure time). At block 320, the processing logic can automatically select the most recently captured image, which was captured just prior to receiving the user request, if the exposure time meets the predetermined criteria. Using the most recently captured image, which is received just prior to receiving the user request, avoids degrading the image if camera shake occurs with the user request.

If the exposure time fails to meet the predetermined criteria (e.g., the exposure time is approximately equal to or greater than the predetermined threshold exposure time), then camera shake (and thus a blurry image) might be a problem. There is a higher chance that the camera moves a noticeable amount if the exposure time is longer. Thus, the processing logic can determine a focus score for each captured image stored in buffer 400 at block 322 if the exposure time fails to meet the predetermined criteria. Alternatively, a user can select one of the buffered images if the exposure time fails to meet the predetermined criteria.

The focus score may be determined based on image quality parameters (e.g., image contrast, image resolution, dynamic range, color rendering properties) using an automatic focus mechanism that can perform an automatic focus scan. This scan positions a lens of the image capturing device in various positions. The automatic focus mechanism can obtain focus scores with each focus score being associated with a respective lens position of the automatic focus scan. In an embodiment, a focus score is a scene-dependent measure of contrast. The automatic focus mechanism can determine whether the obtained focus scores for a scene are acceptable. In an embodiment, a focus area can be automatically determined based on a user selection of a portion of the screen (e.g., touchscreen) of the image capturing device. Then, the automatic focus scan may be initiated for the focus area. The focus scores for the focus area may be obtained prior to the operations of FIG. 3. An image sensing unit may send frames of metadata (e.g., focal-number, exposure time, white balance, focus score) to the processing logic. Focus scores are obtained from the metadata.

In one embodiment, the image sensing unit, for each pixel associated with a previously determined focus area, can compute the absolute difference (in RGB values) horizontally and vertically between adjacent pixels. Then, the horizontal and vertical difference values are combined into a single number for each pixel by either forming the sum or a maximum of those two. Then, for each scan line of an image sensor, these pixel values get combined, by either forming the sum or a maximum. Then the resulting value from each scan line is combined over the entire focus area by adding these values to generate a focus score for the captured image. A higher focus score indicates a sharper image quality.

In an embodiment, the processing logic can apply weighted factors to each of the buffered images at block 324. For example, a most recently captured image T1 may have a weighted factor W1 of 1.0, a next most recently captured image T2 may have a weighted factor W2 of 0.9, and a next most recently captured image T3 may have a weighted factor W3 of 0.83. In this case, the weighted factors are biased towards the image T1. Alternatively, the weighted factors can be biased evenly or away from T1, the most recently captured image just prior to receiving the user request to take a photograph.

Next, the processing logic can determine a product of the focus score and the weighted factor for each of the respective the sequence of images at block 326. For example, the products may include S1*N1, S2*W2, and S3*W3 with S1-S3 being focus scores for the respective the sequence of images. The processing logic can select a most recently captured image having a highest weighted focus score product at block 328 if the exposure time is approximately greater than or equal to the predetermined threshold exposure time. In one embodiment, the images T2 or T3 may be selected over T1 only if a user perceived benefit is achieved. For example, the weighted focus score product for T2 or T3 may need to exceed the product for T1 by a predetermined threshold (e.g., 20%) in order to select T2 or T3 rather than T1, which is the most recently captured image. The processing logic can automatically display the selected image on the display of the image capturing device at block 330.

In an alternative embodiment, the processing logic automatically chronologically displays the sequence of images after receiving a user input to take a photograph. The user can then select which of the sequence of images is most desired by the user (e.g., highest image quality, correct subject, etc.). Alternatively, the processing logic can display the sequence of images in a prioritized order based on image quality, focus score, etc.

The operations of the present disclosure can be performed rearranged, deleted, or include additional operations. For example, in an embodiment, the exposure time of one of the buffered images is used to automatically select one of the buffered images. In this case, no focus scores or weighted factors are needed for selecting one of the buffered images. The blocks 322-328 may be replaced with a new operation that allows a user to select one of the buffered images if the predetermined criteria is not met at block 318. Alternatively, the blocks 322-328 may be replaced or supplemented with motion criteria to automatically select one of the buffered images. For example, a motion sensor integrated with the image capturing device may generate motion information for each captured image. This can be used to select an image captured during a time with no or minimal camera shake.

Alternatively, the blocks 316, 318, and 320 may be optionally removed, and the automatic selection is based on focus scores for each buffered image. These focus scores may be previously calculated during an automatic focus scan. In another embodiment, the motion information is used to filter focus scores.

Many of the methods in embodiments of the present invention may be performed with a digital processing system, such as a conventional, general-purpose computer system. Special purpose computers, which are designed or programmed to perform only one function, may also be used.

Figure 5:
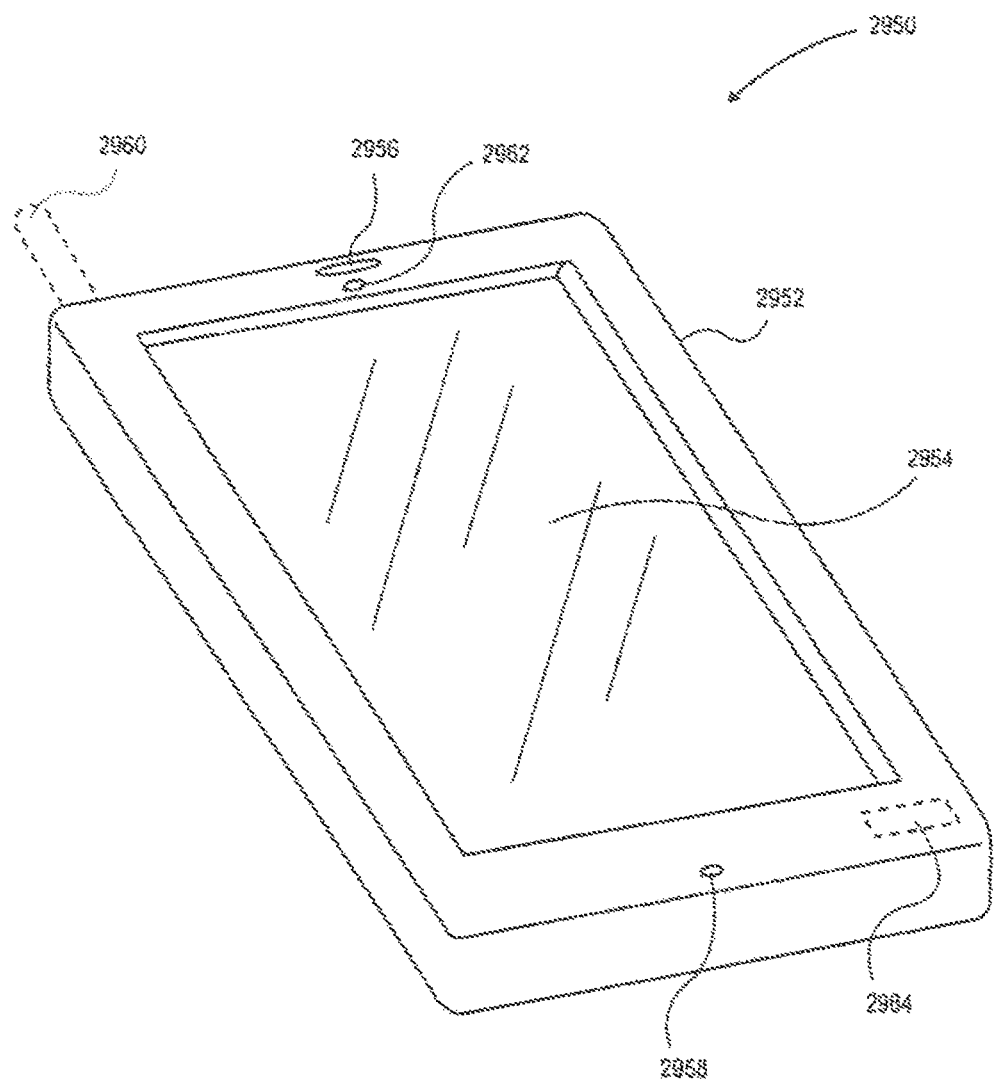
FIG. 5 shows an image capturing device 2950 in accordance with one embodiment of the present invention.
Figure 6:
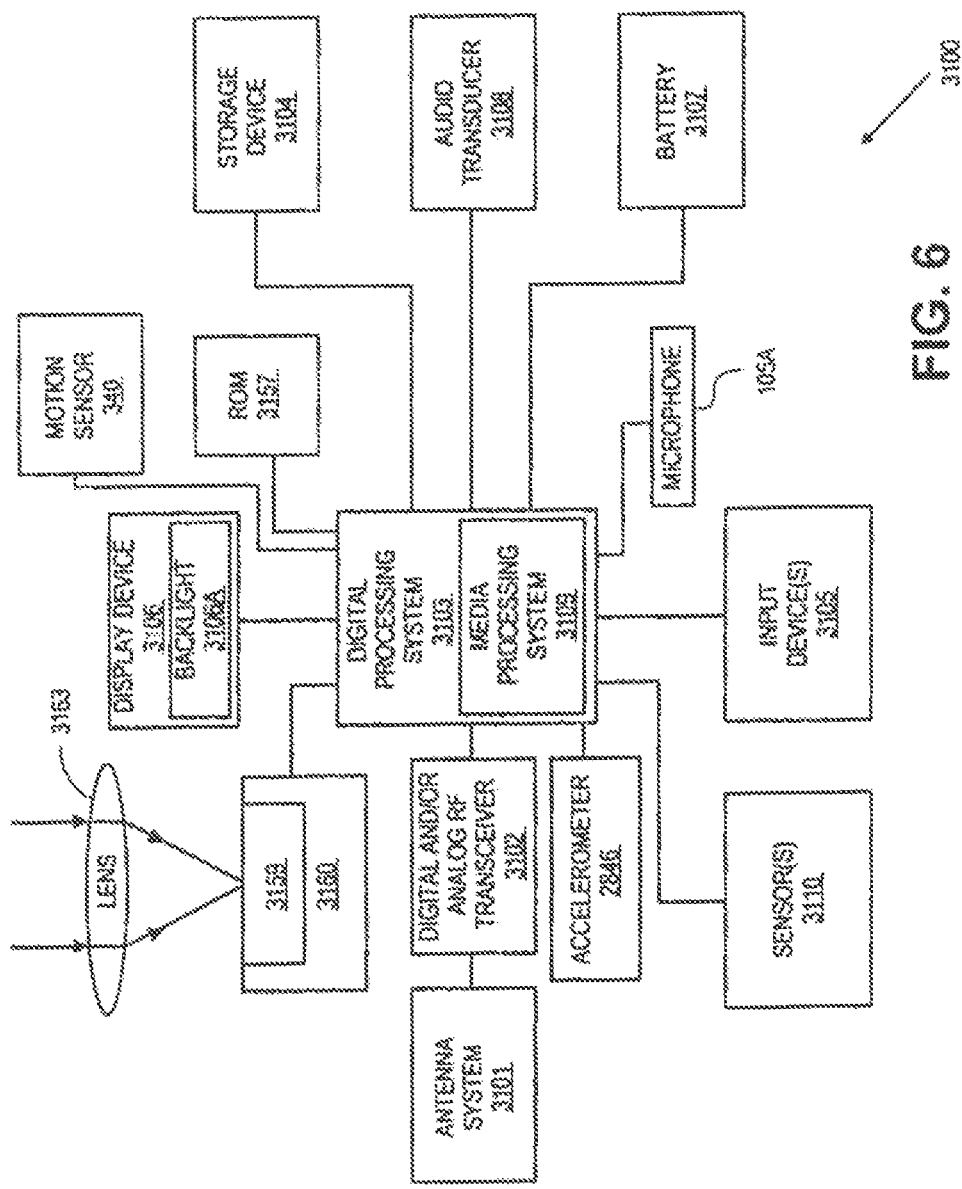
FIG. 6 shows an embodiment of a wireless image capturing device in accordance with one embodiment of the present invention.
Figure 7:
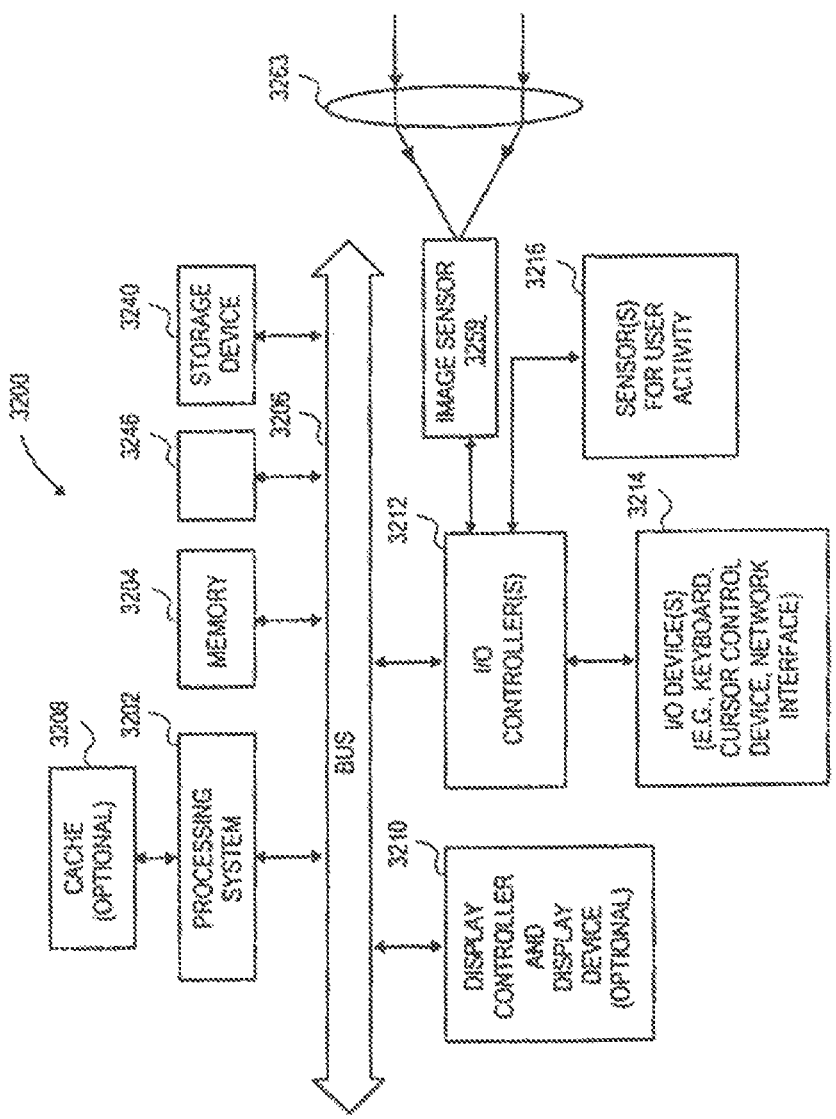
FIG. 7 shows a data processing system according to an embodiment of the present invention.

In some embodiments, the methods, systems, and apparatuses of the present disclosure can be implemented in various devices including electronic devices, consumer devices, data processing systems, desktop computers, portable computers, wireless devices, cellular devices, tablet devices, handheld devices, multi touch devices, multi touch data processing systems, any combination of these devices, or other like devices. FIGS. 5-7 illustrate examples of a few of these devices.

FIG. 5 shows an image capturing device 2950 in accordance with one embodiment of the present invention. The device 2950 may include a housing 2952, a display/input device 2954, a speaker 2956, a microphone 2958 and an optional antenna 2960 (which may be visible on the exterior of the housing or may be concealed within the housing). The device 2950 also may include a proximity sensor 2962 and a motion sensor 2964 (e.g., a gyroscope, a motion detector, a tilt sensor such as mercury switch, a compass, or any combination thereof) that generates motion information. The device 2950 may be a cellular telephone or a device which is an integrated PDA and a cellular telephone or a device which is an integrated media player and a cellular telephone or a device which is both an entertainment system (e.g. for playing games) and a cellular telephone, or the device 2950 may be other types of devices described herein. In one particular embodiment, the device 2950 may include a cellular telephone and a media player and a PDA, all contained within the housing 2952. The device 2950 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer, an iPhone, and an iPod are portable devices.

In certain embodiments of the present disclosure, the device 2950 can be used to implement at least some of the methods discussed in the present disclosure.

FIG. 6 shows an embodiment of a wireless image capturing device which includes the capability for wireless communication and for capturing images. Wireless device 3100 may include an antenna system 3101. Wireless device 3100 may also include a digital and/or analog radio frequency (RF) transceiver 3102, coupled to the antenna system 3101, to transmit and/or receive voice, digital data and/or media signals through antenna system 3101.

Wireless device 3100 may also include a digital processing system 3103 to control the digital RF transceiver and to manage the voice, digital data and/or media signals. Digital processing system 3103 may be a general purpose processing system, such as a microprocessor or controller for example. Digital processing system 3103 may also be a special purpose processing system, such as an ASIC (application specific integrated circuit), FPGA (field-programmable gate array) or DSP (digital signal processor). Digital processing system 3103 may also include other devices, as are known in the art, to interface with other components of wireless device 3100. For example, digital processing system 3103 may include analog-to-digital and digital-to-analog converters to interface with other components of wireless device 3100. Digital processing system 3103 may include a media processing system 3109, which may also include a general purpose or special purpose processing system to manage media, such as files of audio data.

Wireless device 3100 may also include a storage device 3104, coupled to the digital processing system, to store data and/or operating programs and capture images for the Wireless device 3100. Storage device 3104 may be, for example, any type of solid-state or magnetic memory device. Storage device 3104 may be or include a machine-readable medium.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

Wireless device 3100 may also include one or more input devices 3105, coupled to the digital processing system 3103, to accept user inputs (e.g., telephone numbers, names, addresses, media selections, etc.) Input device 3105 may be, for example, one or more of a keypad, a touchpad, a touch screen, a pointing device in combination with a display device or similar input device.

Wireless device 3100 may also include at least one display device 3106, coupled to the digital processing system 3103, to display information such as messages, telephone call information, contact information, pictures, images, movies and/or titles or other indicators of media being selected via the input device 3105. Display device 3106 may be, for example, an LCD display device. In one embodiment, display device 3106 and input device 3105 may be integrated together in the same device (e.g., a touch screen LCD such as a multi-touch input panel which is integrated with a display device, such as an LCD display device). The display device 3106 may include a backlight 3106A to illuminate the display device 3106 under certain circumstances. It will be appreciated that the wireless device 3100 may include multiple displays.

Wireless device 3100 may also include a battery 3107 to supply operating power to components of the system including digital RF transceiver 3102, digital processing system 3103, storage device 3104, input device 3105, microphone 3105A, audio transducer 3108, media processing system 3109, sensor(s) 3110, and display device 3106, and an image sensor 3159 (e.g., CCD (Charge Coupled Device), CMOS based device). The image sensor may be integrated with an image processing unit 3160. The display device 3106 may include a Liquid Crystal Display (LCD) which may be used to display images which are captured or recorded by the wireless image capturing device 3100. The LCD serves as a viewfinder of a camera and there may optionally be other types of image display devices on device 3100 which can serve as a viewfinder.

The device 3100 also includes an imaging lens 3163 which can be disposed over image sensor 3159. The processing system 3103 controls the operation of the device 3100; and, it may do so by executing a software program stored in ROM 3157, or in the processing system 3103, or in both ROM 3157 and the processing system 3103.

The processing system 3103 controls the image processing operation; and, it controls the storage of a captured image in storage device 3104. The processing system 3103 also controls the exporting of image data (which may or may not be color corrected) to an external general purpose computer or special purpose computer.

The processing system 3103 also responds to user commands (e.g., a command to "take" a picture or capture video by capturing image(s) on the image sensor and storing the image(s) in memory or a command to select an option for contrast enhancement and color balance adjustment).

The ROM 3157 may store software instructions for execution by the processing system 3103 to enter an image capture mode, continuously capture and display images, continuously store the sequence of images in a buffer, automatically select one of the buffered images, and automatically display the selected image. The storage device 3104 is used to store captured/recorded images which are received from the image sensor 3159. It will be appreciated that other alternative architectures of a camera can be used with the various embodiments of the invention.

Battery 3107 may be, for example, a rechargeable or non-rechargeable lithium or nickel metal hydride battery. Wireless device 3100 may also include audio transducers 3108, which may include one or more speakers, and at least one microphone 3105A, an accelerometer 2846, and a motion sensor 340 (e.g., an accelerometer, a gyroscope, a motion detector, a tilt sensor such as mercury switch, a compass, or any combination thereof) to determine motion information for the device. The processing system is configured to determine whether the device is moving based on the motion information. More details regarding motion sensors and use of the motion information for image capturing devices can be found in application Ser. No. 12/479,470, filed Jun. 5, 2009, entitled "Camera Image Selection Based on Detected Device Movement" which is incorporated by reference in entirety herein.

In some embodiments, the image capturing device 3100 includes the storage device 3104 to store captured images, the lens 3163 to receive incident light associated with an image to be captured, and the processing system 3103 coupled to the storage device 3104 and the lens 3163. The device also includes a display device 3106 coupled to the storage device 3104. The display device can display the captured images.

The processing system 3103 can be configured, after entry into a mode, to continuously capture images, to store a predetermined number of the sequence of images in a buffer, to receive a user request to capture an image, and in response to the user request, automatically selecting one of the buffered images based on an image contrast parameter that compares pixel values within each buffered image. In an embodiment, the buffer may be located in the system 3100 or in the unit 3160. The sequence of images may be captured just prior to receiving the user request. The processing system 3103 while automatically selecting one of the buffered images based on the image contrast parameter is further configured to determine a focus score for a focus area of each buffered image.

The processing system 3103 also can be configured to automatically select one of the buffered images which were all captured prior to receiving the user request. In an embodiment, the sequence of images can include only images captured just prior to receiving the user request to take a photograph. In one embodiment, the sequence of images stored in the storage device can include the three images captured by the image capturing device just prior to receiving the user request.

In some embodiments of the present disclosure, the wireless device 3100 can be used to implement at least some of the methods discussed in the present disclosure.

FIG. 7 shows an example of a data processing system according to an embodiment of the present invention. This data processing system 3200 may include a processing system 3202, and a memory 3204, which are coupled to each other through a bus 3206. The data processing system 3200 may optionally include a cache 3208 which is coupled to the processing system 3202. The data processing system may optionally include a storage device 3240 which may be, for example, any type of solid-state or magnetic memory data processing system. Storage device 3240 may be or include a machine-readable medium.

This data processing system may also optionally include a display controller and display device 3210 which is coupled to the other components through the bus 3206. One or more input/output controllers 3212 are also coupled to the bus 3206 to provide an interface for input/output device 3214 and to provide an interface for one or more sensors 3216 which are for sensing user activity. The bus 3206 may include one or more buses connected to each other through various bridges, controllers, and/or adapters as is well known in the art. The input/output devices 3214 may include a keypad or keyboard or a cursor control data processing system such as a touch input panel. Furthermore, the input/output devices 3214 may include a network interface which is either for a wired network or a wireless network (e.g. an RF transceiver). The sensors 3216 may be any one of the sensors described herein including, for example, a proximity sensor or an ambient light sensor. In at least certain implementations of the data processing system 3200, the processing system 3202 may receive data from one or more sensors 3216 or from image sensor 3259 or from accelerometer 3246 and may perform the analysis of that data in the manner described herein. Image sensor 3259 captures an image via light focused by lens 3263.

In certain embodiments of the present disclosure, the data processing system 3200 can be used to implement at least some of the methods discussed in the present disclosure.

In some embodiments, the data processing system 3200 includes a storage device 3240 to store a plurality of captured images and a lens coupled to the storage device. The lens receives light associated with the captured images and focuses the light onto an image sensor 3259. The system 3200 also includes a display device 3210 that displays images captured by the sensor 3259.

In some embodiments, the processing system is configured to continuously capture a sequence of images; to store a predetermined number of the sequence of images in a buffer, to receive a user request to capture an image; and to automatically select one of the buffered images based on an exposure time of one of the buffered images. The sequence of images may be captured prior to or concurrently with receiving the user request. In embodiments, the buffer may be located in the system 3202 or the cache 3208 or memory 3204 or integrated with the image sensor 3259 and associated processing circuitry.

The processing system while automatically selecting one of the buffered images is further configured to determine an exposure time of one of the buffered images, determine whether the exposure time meets predetermined criteria based on a predetermined threshold exposure time, and select the most recent image if the exposure time meets the predetermined criteria. The processing system is also configured to initiate the continuously capturing and the storing after the data processing system enters an image capture mode.

The processing system while automatically selecting one of the buffered images is further configured to determine a focus score for each buffered image and to select a buffered image based on the focus score if the exposure time fails to meet the predetermined criteria. The processing system while selecting a buffered image based on the focus score is further configured to determine a product of the focus score and the weighted factor for each of the buffered images and select a buffered image having a highest product if the exposure time fails to meet the predetermined criteria.

The methods of the present invention can be implemented using dedicated hardware (e.g., using Field Programmable Gate Arrays, or Application Specific Integrated Circuit, which many be integrated with image sensors (e.g., CCD or CMOS) or shared circuitry (e.g., microprocessors or microcontrollers under control of program instructions stored in a machine readable medium, such as memory chips) for an imaging device. The methods of the present invention can also be implemented as computer instructions for execution on a data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   (a) entering an image capture mode;
   (b) sequentially during the image capture mode capturing images with an image capturing device and associating metadata with each captured image;
   (c) as each new image is captured during the sequential capturing, storing the new image and its associated metadata in a buffer until the buffer contains a predetermined number of the sequentially captured images and their associated metadata;

(d) as each additional new image is captured during the sequential capturing, storing the additional new image and its metadata in the buffer and discarding the oldest image of the predetermined number of the sequentially captured images and its metadata from the buffer;

(e) continuing operations (b) through (d) until a user request to capture an image is received;

(f) in response to the user request to capture an image, capturing a final image corresponding to the time of the user request, and associating metadata with the final image;

(g) storing the final image and its associated metadata;

(h) examining at least the metadata associated with the final image and at least the metadata associated with the predetermined number of images stored in the buffer;

(i) assigning an image quality parameter to the final image and to each of the predetermined number of images based upon the metadata associated with the images;

(j) selecting at least one of the predetermined number of images and the final image as likely desirable based upon the image quality assignments from operation (i);

(k) displaying the final image to the user;

(l) allowing the user to display the predetermined number of images from the buffer while identifying to the user which of the predetermined number of images was selected as likely desirable in operation (j);

(m) allowing the user to choose one of the predetermined number of images if the user determines that the chosen image is more desirable than the final image; and (n) storing the chosen image.

2. A method as claimed in claim 1 wherein the metadata includes information indicative of the exposure time of the associated image and wherein operation (i) comprises assigning an image quality parameter based at least on the exposure time.

3. A method as claimed in claim 1 wherein the metadata includes information indicative of the contrast of the associated image and wherein operation (i) comprises assigning an image quality parameter based at least on the contrast.

4. A method as claimed in claim 1 wherein the metadata includes information indicative of the resolution of the associated image and wherein operation (i) comprises assigning an image quality parameter based at least on the resolution.

5. A method as claimed in claim 1 wherein the metadata includes information indicative of the resolution of the associated image and wherein operation (i) comprises assigning an image quality parameter based at least on the resolution.

6. A method as claimed in claim 1 wherein the metadata includes information indicative of the dynamic range of the associated image and wherein operation (i) comprises assigning an image quality parameter based at least on the dynamic range.

7. A method as claimed in claim 1 wherein the metadata includes information indicative of the color rendering properties of the associated image and wherein operation (i) comprises assigning an image quality parameter based at least on the color rendering properties.

8. A method as claimed in claim 1 wherein the metadata includes information indicative of the exposure time, contrast, resolution, dynamic range, and color rendering properties of the associated image and wherein operation (i) comprises assigning an image quality parameter based upon one or more of the exposure time, contrast, resolution, dynamic range, and color rendering properties.

9. A method as claimed in claim 1 wherein the metadata includes information indicative of the focus of the associated image and wherein operation (i) comprises assigning an image quality parameter based at least on the focus.

10. A method as claimed in claim 9 wherein the metadata indicative of the focus of the associated image comprises a focus score.

11. A method as claimed in claim 1 wherein the metadata includes information indicative of camera shake during the capture of the associated image and wherein operation (i) comprises assigning an image quality parameter based at least on camera shake.

12. A method of capturing an image comprising:
continuously capturing digital images with an image capturing device;
storing each captured digital image in a data buffer having the capacity to store a predetermined number of captured digital images;
during the continuous capture of digital images, receiving a user request via a shutter release to capture an image and capturing a final image concurrently with the user request;
discontinuing the continuous capture of digital images;
analyzing at least the exposure time of the final digital image and the predetermined number of continuously captured digital images stored in the data buffer;
selecting one or more of the final digital image and the predetermined number of digital images stored in the buffer based upon the analysis of at least the exposure time for each digital image;
displaying the final digital image and the predetermined number of digital images stored in the buffer to the user while indicating to the user the one or more selected images;
allowing the user to select one of the displayed images; and
storing the image selected by the user.

13. A method of improving the results of taking a photograph with a digital image capture device, the method comprising:
(a) selecting a camera mode for the digital image capture device;
(b) displaying to a user on a viewfinder screen of the digital image capture device a video of the scene at which the digital image capture device is pointed;
(c) while displaying the video, continuously capturing a sequence of images of the scene with the digital image capture device and storing a predetermined number of the sequence of images in a data buffer;
(d) receiving a signal indicative of a user request to capture an image;
(e) upon receiving the signal indicative of the user request, storing a final image captured as a result of receiving the signal;
(f) analyzing information about the final image and the predetermined number of images stored in the buffer;
(g) automatically selecting one or more of the final image and the predetermined number of images that is potentially desirable based upon at least one of an exposure time, an image contrast, an image resolution, and a dynamic range;
(h) displaying to the user on the viewfinder screen the final image and the predetermined number of stored images with images selected by the automatically selecting operation being identified as potentially desirable;

(i) allowing the user to select from among the images displayed in operation (h) an image that is desired by the user, and (j) storing the image selected by the user in operation (i) in a photo library.

14. A non-transitory machine readable medium storing executable instructions which when executed by a data processing system cause the data processing system to perform a method comprising:

(a) entering an image capture mode;

(b) sequentially during the image capture mode capturing images with an image capturing device and associating metadata with each captured image;

(c) as each new image is captured during the sequential capturing, storing the new image and its associated metadata in a buffer until the buffer contains a predetermined number of the sequentially captured images and their associated metadata;

(d) as each additional new image is captured during the sequential capturing, storing the additional new image and its metadata in the buffer and discarding the oldest image of the predetermined number of the sequentially captured images and its metadata from the buffer;

(e) continuing operations (b) through (d) until a user request to capture an image is received;

(f) in response to the user request to capture an image, capturing a final image corresponding to the time of the user request, and associating metadata with the final image;

(g) storing the final image and its associated metadata;

(h) examining at least the metadata associated with the final image and at least the metadata associated with the predetermined number of images stored in the buffer;

(i) assigning an image quality parameter to the final image and to each of the predetermined number of images based upon the metadata associated with the images;

(j) selecting at least one of the predetermined number of images and the final image as likely desirable based upon the image quality assignments from operation (i);

(k) displaying the final image to the user;

(l) allowing the user to display the predetermined number of images from the buffer while identifying to the user which of the predetermined number of images was selected as likely desirable in operation (j);

(m) allowing the user to choose one of the predetermined number of images if the user determines that the chosen image is more desirable than the final image; and (n) storing the chosen image.

15. The medium as claimed in claim 14 wherein the metadata includes information indicative of the exposure time of the associated image and wherein operation (i) comprises assigning an image quality parameter based at least on the exposure time.

16. The medium as claimed in claim 14 wherein the metadata includes information indicative of the contrast of the associated image and wherein operation (i) comprises assigning an image quality parameter based at least on the contrast.

17. The medium as claimed in claim 14 wherein the metadata includes information indicative of the resolution of the associated image and wherein operation (i) comprises assigning an image quality parameter based at least on the resolution.

18. The medium as claimed in claim 14 wherein the metadata includes information indicative of the resolution of the associated image and wherein operation (i) comprises assigning an image quality parameter based at least on the resolution.

19. The medium as claimed in claim 14 wherein the metadata includes information indicative of the dynamic range of the associated image and wherein operation (i) comprises assigning an image quality parameter based at least on the dynamic range.

20. The medium as claimed in claim 14 wherein the metadata includes information indicative of the color rendering properties of the associated image and wherein operation (i) comprises assigning an image quality parameter based at least on the color rendering properties.

21. The medium as claimed in claim 14 wherein the metadata includes information indicative of the exposure time, contrast, resolution, dynamic range, and color rendering properties of the associated image and wherein operation (i) comprises assigning an image quality parameter based upon one or more of the exposure time, contrast, resolution, dynamic range, and color rendering properties.

22. The medium as claimed in claim 14 wherein the metadata includes information indicative of the focus of the associated image and wherein operation (i) comprises assigning an image quality parameter based at least on the focus.

23. The medium as claimed in claim 22 wherein the metadata indicative of the focus of the associated image comprises a focus score.

24. The medium as claimed in claim 14 wherein the metadata includes information indicative of camera shake during the capture of the associated image and wherein operation (i) comprises assigning an image quality parameter based at least on camera shake.

* * * * *